(12) United States Patent
Urano et al.

(10) Patent No.: US 7,452,398 B2
(45) Date of Patent: Nov. 18, 2008

(54) PHOSPHATE AND POTASH(PK)-CONTAINING COMPOUND FERTILIZER

(75) Inventors: Teruo Urano, Sano (JP); Yuya Sato, Sano (JP)

(73) Assignee: Murakashi Lime Industrial Co., Ltd., Sano-Shi, Tochigi (JP)

( * ) Notice: Subject to any disclaimer, the term of this patent is extended or adjusted under 35 U.S.C. 154(b) by 163 days.

(21) Appl. No.: 11/518,867

(22) Filed: Sep. 11, 2006

(65) Prior Publication Data

US 2007/0062232 A1 Mar. 22, 2007

Related U.S. Application Data

(63) Continuation of application No. PCT/JP2006/306595, filed on Mar. 23, 2006.

(30) Foreign Application Priority Data

Apr. 21, 2005 (JP) .............................. 2005-123767

(51) Int. Cl.
*C05B 3/00* (2006.01)

(52) U.S. Cl. ........................ 71/32; 71/21; 71/33; 71/34; 71/37; 71/39; 71/40; 71/41; 71/48

(58) Field of Classification Search ............ 71/15, 71/21, 32, 33, 34, 37, 39, 40, 41, 48

See application file for complete search history.

(56) References Cited

U.S. PATENT DOCUMENTS

| | | | | |
|---|---|---|---|---|
| 3,050,383 | A * | 8/1962 | Wilson | 71/11 |
| 5,240,490 | A * | 8/1993 | Moore | 71/17 |
| 5,393,317 | A * | 2/1995 | Robinson | 71/12 |
| 5,928,403 | A * | 7/1999 | Moore, Jr. | 71/21 |
| 6,312,492 | B1 * | 11/2001 | Wilson | 71/21 |
| 6,758,879 | B2 * | 7/2004 | Greer et al. | 71/11 |
| 2002/0182710 | A1 * | 12/2002 | Horn et al. | 435/262 |
| 2004/0168492 | A1 * | 9/2004 | Cheung | 71/21 |
| 2004/0265266 | A1 * | 12/2004 | Champ et al. | 424/76.21 |

FOREIGN PATENT DOCUMENTS

| | | |
|---|---|---|
| JP | 57-140387 | 8/1982 |
| JP | 2003-238277 | 8/2003 |

OTHER PUBLICATIONS

English translation of the International Preliminary Report on Patentability of corresponding PCT Application No. PCT/JP2006/306595 (Form PCT/IB/338).

* cited by examiner

*Primary Examiner*—Wayne Langel
(74) *Attorney, Agent, or Firm*—Weingarten, Schurgin, Gagnebin & Lebovici LLP

(57) ABSTRACT

The primary object of the invention is to provide a method of producing novel phosphate and potash (PK) containing compound fertilizers in the form of powders showing good handle-ability by which method the phosphate components contained in an incinerated ash residue of chicken droppings is improved in solubility and thus rendered effective or available and, at the same time, the free CaO-derived alkali is neutralized, as well as such novel phosphate and potash(PK) containing compound fertilizers. The above object can be accomplished by adding an alkaline earth metal compound to the powdery incinerated ash residue of chicken droppings, adding a mineral acid to the resulting mixture, allowing the reaction to proceed and raising the reaction system temperature by utilizing the heat of reaction of the powdery alkaline earth metal compound with the mineral acid to thereby promote the reaction between the free CaO contained in the incinerated ash residue of chicken droppings and so forth with the mineral acid and convert the phosphate components to citric acid-soluble $P_2O_5$ and, at the same time, maintaining the product neutral or weakly acidic.

5 Claims, No Drawings

PHOSPHATE AND POTASH(PK)-CONTAINING COMPOUND FERTILIZER

This application is a continuation application of PCT/JP2006/306595 filed Mar. 23, 2006, and claims priority to Japanese application No. 2005-123767 filed Apr. 21, 2005.

TECHNICAL FIELD

The present invention relates to a new process to produce a novel phosphate and potash(PK)-containing compound fertilizer and to a novel phosphate and potash(PK)-containing compound fertilizer with the said process. More particularly, it relates to a method of producing a novel phosphate and potash(PK)-containing compound fertilizer by utilizing residual ash derived from calcination of chicken droppings and treating the phosphate components contained therein with a mineral acid to render them effective or available and to such a novel phosphate and potash(PK)-containing compound fertilizer.

BACKGROUND ART

Poultry manure is used as an organic fertilizer. Chicken droppings just after discharged from chicken or fowls contain water abundantly and have a characteristic odor. According to statistics for 1999, $843 \times 10^4$ tons of chicken droppings were discharged in poultry farms for egg production and $533 \times 10^4$ tons in poultry farms for raising broilers in Japan.

To utilize chicken droppings and excreta from other farm animals is important for the promotion of sustainable agriculture, for example in supplementing the farm land with organic matters and reducing the consumption of chemical fertilizers. On the other hand, from the viewpoint of preservation of the environment as well, appropriate methods of treating them are demanded.

Currently, chicken droppings are subjected, in the conventional manner, to drying treatment, fermentation treatment, carbonization treatment and incineration treatment at about 800° C. for ashing, and the calcined ash, after particle size adjustment, is used as a fertilizer.

In recent years, an increasing number of methods comprising burning chicken droppings to reduce the volume thereof and give an odorless ash, namely an calcined ash residue of chicken droppings, have been proposed as ecofriendly measures.

In an example, the chemical composition of the ash obtained from chicken droppings by 1.5 hours of treatment at 800° C. is as follows: CaO 32.0%, $K_2O$ 15.5%, $P_2O_5$ 20.1%, $SO_3$ 10.0%, MgO 5.5%, Cl 5.5%, $Na_2O$ 3.0%, $SiO_2$ 3.0%, $Al_2O_3$ 0.59%, $Fe_2O_3$ 0.56%, MnO 0.21%, and ZnO 0.19%, with the loss on ignition (Ig. Loss) at 1000° C. being 3.7%.

In the above data, "%" indicates "% by mass" and, hereinafter, unless otherwise specified, "%" indicates "% by mass".

Upon powder X-ray diffractometry, $Ca_3(PO_4)_2$ [tricalcium phosphate], $Ca_5(PO_4)_3(OH)$ [hydroxyapatite], potassium chloride, quick lime (calcium oxide), slaked lime (calcium hydroxide) and calcium carbonate, among others, could be identified based on the chemical composition. Thus, the calcined ash residue of chicken droppings is rich in fertilizer nutrients, in particular phosphate($P_2O_5$) and potash($K_2O$). However, they contain calcium compounds abundantly, which occur as quick lime formed upon incineration, slaked lime derived from quick lime as a result of absorption of moisture from the air during cooling and standing in the atmosphere, and undecomposed calcium carbonate. Thus, such calcined ash residues are strongly alkaline. Therefore, they, as such, cannot be mixed with other acid fertilizers or with ammonium nitrogen-containing fertilizers. The $P_2O_5$ component is mostly derived from hydroxyapatite and tricalcium phosphate. These phosphate salts have drawbacks: they are hardly soluble and low in fertilizer effect. The potassium component occurs as potassium chloride (KCl).

For efficient utilization of chicken droppings, a method has been proposed which comprises burning chicken droppings in the ambient atmosphere or in a low-oxygen condition to give an industrially useful fertilizer composition high in degree of elution of water-soluble potassium (cf. Patent Document 1: Japanese Laid-Open (Kokai) Publication No.2003-238277). This method indeed makes it possible to reduce the volume of chicken droppings, destroy the odor and remove hazardous organic compounds but cannot be expected to render the phosphate components effective or available.

It is known in the art to treat the calcined ash residue of chicken droppings with an acid to thereby render the phosphate components contained therein effective or available (cf. Patent Document 2: Japanese Laid-Open (Kokai) Publication No. S57-140387). For allowing the reaction between a powder and a liquid to proceed homogeneously and efficiently, it is generally recommended that both be subjected to reaction in the form of a slurry rich in water.

However, the resulting reaction product is high in water content and congeals or occurs as a paste; hence, as such, it cannot serve as a product.

A method of producing a phosphate, potash and magnesium-containing fertilizer has been proposed which comprises adding a small amount of thickening agent to the calcined ash, adding sulfuric acid and/or orthophosphoric acid and carrying out the reaction under hydrous conditions to convert the phosphates contained in the calcined ash to effective or available phosphate forms and increase the solubility of the potassium-and magnesium-containing components contained in the ash, and recovering the reaction product in the form of a powder to give the desired fertilizer, without grinding the same (cf. Patent Document 2).

What is important in this process is to obtain the product in the form of a powder by utilizing the heat generated by the reaction between the alkaline components contained in the calcined ash residue of chicken droppings and the acid to thereby raise the system inside temperature and evaporating the excess water. However, even by this method, the heat of reaction is insufficient to solubilize the phosphate components contained in the calcined ash residue of chicken droppings and evaporate the excess water, the temperature raising in the system inside is limited, a long reaction time is required, and the phosphate components are rendered effective or available only to an unsatisfactory extent.

Accordingly, it is a first object of the invention to provide a method of producing a novel phosphate and potash(PK)-containing compound fertilizer in the form of a powder with good handleability by efficiently carrying out the reaction between the calcined ash residue of chicken droppings and a mineral acid to render effective or available the hardly soluble $Ca_5(PO_4)_3(OH)$ [hydroxyapatite] and $Ca_3(PO_4)_2$ [tricalcium phosphate] contained in the ash by converting them to citric acid-soluble components and, at the same time, maintaining the product in a neutral or slightly acidic condition to thereby make it possible to blend the product with another acid fertilizer and/or an ammoniacal nitrogen fertilizers.

A second object of the invention is to provide a novel phosphate and potash(PK)-containing compound fertilizer excellent in characteristics as produced by such a production method.

DISCLOSURE OF THE INVENTION

As a result of intensive investigations made by them, the present inventors found that when an alkaline earth metal compound in powder form is added to the calcined ash residue of chicken droppings and the resulting mixture is reacted with a phosphoric acid solution or a phosphoric acid-sulfuric acid mixed acid, or with sulfuric acid, the heat of neutralization reaction between the alkaline earth metal compound in powder form and the mineral acid can be utilized to elevate the temperature of the reaction system, whereby the reaction between the lime fraction, tricalcium phosphate and hydroxyapatite contained in the calcined ash residue of chicken droppings and the mineral acid is promoted to convert the $P_2O_5$ components to dicalcium phosphate $CaHPO_4$ or $CaHPO_4.2H_2O$, which is a phosphate soluble in 2% citric acid (hereinafter sometimes referred to as "citric acid-soluble"), and thus render those components effective or available and, in this way, a novel phosphate and potash(PK)-containing compound fertilizer containing such a phosphate and occurring as a powder showing good handleability can be obtained. At the same time, it was found that a novel phosphate and potash(PK)-containing compound fertilizer, which can be blended with other acid fertilizers or ammoniacal nitrogen fertilizers, can be obtained preferably by maintaining the product in a neutral or slightly acidic condition. Based on such findings, the present invention has been completed.

Thus, for accomplishing the above objects, the present invention, in a first aspect thereof, provides a method of producing novel phosphate and potash(PK)-containing compound fertilizers which comprises admixing 5-200 parts by mass of an alkaline earth metal compound with 100 parts by mass of the calcined ash residue of chicken droppings, adding a mineral acid thereto, and allowing the reaction to proceed.

In a second aspect, the invention provides a method as in the first aspect of the invention, wherein the alkaline earth metal compound comprises one or two or more species selected from among calcium hydroxide, calcium oxide, calcium carbonate, calcined shells, magnesium hydroxide, magnesium oxide, magnesium carbonate, dolomite and shell powders.

In a third aspect, the invention provides a method as in the first or second aspect of the invention, wherein the mineral acid is either one of phosphoric acid and sulfuric acid or a mixture thereof.

In a fourth aspect, the invention provides a novel phosphate and potash(PK)-containing compound fertilizer characterized in that it is a product obtained by any of the production methods provided in the first to third aspects of the invention.

In a fifth aspect, the invention provides a novel phosphate and potash(PK)-containing compound fertilizer as provided in the fourth aspect of the invention which has a pH of not higher than 7.0.

The method of producing novel phosphate and potash (PK)-containing compound fertilizer as provided in accordance with the first aspect of the invention is characterized in that 5-200 parts by mass of an alkaline earth metal compound is admixed with 100 parts by mass of the calcined ash residue of chicken droppings, a mineral acid is added to the mixture and the reaction is allowed to proceed, and, according to the method, the following marked effects are produced: it is possible to increase the temperature of the reaction system by utilizing the heat of neutralization reaction between the alkaline earth metal compound with the mineral acid and thereby promote the reaction between the calcined ash residue of chicken droppings and the mineral acid, whereby the reaction can be carried out efficiently for the hardly soluble $Ca_5(PO_4)_3(OH)$ [hydroxyapatite] and $Ca_3(PO_4)_2$ [tricalcium phosphate] contained in the ash to be converted to citric acid-soluble components and thus rendered effective or available; at the same time, the product is maintained in a neutral or weakly acidic condition and thus can be blended with other acid fertilizers and/or ammonium nitrogen-containing fertilizers and, in addition, the product can be readily obtained in the form of a powder showing good handleability.

The method in accordance with the second aspect of the invention is characterized in that, in the production method provided in the first aspect of the invention, the alkaline earth metal compound comprises one or two or more species selected from among calcium hydroxide, calcium oxide, calcium carbonate, calcined shells, magnesium hydroxide, magnesium oxide, magnesium carbonate, dolomite and shell powders. In this aspect, the following additional marked effects are produced: such species are inexpensive and readily available, and the neutralization reaction with the mineral acid proceeds in a satisfactory manner, so that the heat of neutralization can be utilized for elevating the temperature of the reaction system and promoting the reaction between the incinerated ash residue of chicken droppings and the mineral acid to make it possible to carry out the reaction more efficiently.

The method in accordance with the third aspect of the invention is characterized in that, in the production method provided in the first or second aspect of the invention, the mineral acid is either one of phosphoric acid and sulfuric acid or a mixture thereof. In this aspect, the following additional marked effects are produced: such mineral acid is inexpensive and readily available, and the neutralization reaction with the alkaline earth metal compound proceeds in a satisfactory manner, so that the heat of neutralization can be utilized for elevating the temperature of the reaction system and promoting the reaction between the incinerated ash residue of chicken droppings and the mineral acid to make it possible to carry out the reaction more efficiently.

The novel phosphorus/potassium-containing compound fertilizer in accordance with the fourth aspect of the invention is characterized in that it is a product obtained by any of the production methods in accordance with the first to third aspects of the invention. It produces the following marked effects: as a result of conversion of the hardly soluble $Ca_5(PO_4)_3(OH)$ [hydroxyapatite] and $Ca_3(PO_4)_2$ [tricalcium phosphate] contained in the incinerated ash residue of chicken droppings to citric acid-soluble components, it can be effectively used with high efficiency and, at the same time, it can be used not only singly but also in admixture with other acid fertilizers and/or ammonium nitrogen-containing fertilizers because of its being neutral or weakly acidic and, further, it occurs as a powder with good handleability.

The fifth aspect of the invention is characterized in that the novel phosphorus/potassium-containing compound fertilizer as provided in the fourth aspect of the invention has a pH of not higher than 7.0; it produces the following further marked effect: since it is neutral or weakly acidic with certainty, it can easily be utilized not only singly but also in admixture with other acidic fertilizers and/or ammonium nitrogen-containing fertilizers.

BEST MODE FOR CARRYING OUT THE INVENTION

In the following, the present invention is described in further detail.

In the reaction of the incinerated ash residue of chicken droppings and a phosphoric acid solution, $H_3PO_4$ first reacts preferentially with the free CaO component contained in the incinerated ash and then reacts with tricalcium phosphate and hydroxyapatite.

Considering the handleability of the product, adjustments should be made so that the reaction product may be obtained in the form of a powder as much as possible and a certain number of lumps, if any, may be crushed with ease using a hammer crusher or a like crusher. For that purpose, it is necessary to contrive to reduce the viscosity of the product and obtain the product showing no tendency toward caking.

For that purpose, the mineral acid solution to be added and involved in the reaction is desired to have a concentration as high as possible and, when the mineral acid is phosphoric acid, crude phosphoric acid can be used without causing any problem. The term "crude phosphoric acid" as used herein means an unpurified concentrated phosphoric acid solution as manufactured from a phosphate ore by the wet process and containing the $P_2O_5$ component in the form of $H_3PO_4$. Currently existing crude phosphoric acid solution species contain 4-6 parts by mass of raw material-derived sulfuric acid as $H_2SO_4$ in addition to 44-48 parts by mass of phosphoric acid as expressed on the $P_2O_5$ basis.

When the incinerated ash residue of chicken droppings is subjected to reaction with a crude orthophosphoric acid solution, the reaction between the alkaline earth metal compound and the orthophosphoric acid is occurs first preferentially prior to the reaction between the calcium phosphate components of the incinerated ash residue of chicken droppings and the crude phosphoric acid solution.

The reaction between the alkaline earth metal compound and the orthophosphoric acid solution includes the following reaction species:

$$CaO + 2H_3PO_4 \rightarrow Ca(H_2PO_4)_2 \cdot H_2O \quad (1)$$

$$Ca(OH)_2 + 2H_3PO_4 \rightarrow Ca(H_2PO_4)_2 \cdot H_2O + H_2O \quad (2)$$

$$CaCO_3 + 2H_3PO_4 \rightarrow Ca(H_2PO_4)_2 \cdot H_2O + CO_2 \quad (3)$$

$$CaO + H_3PO_4 \rightarrow CaHPO_4 + H_2O \quad (4)$$

$$Ca(OH)_2 + H_3PO_4 \rightarrow CaHPO_4 + 2H_2O \quad (5)$$

$$CaCO_3 + H_3PO_4 \rightarrow CaHPO_4 + CO_2 + H_2O \quad (6)$$

$$Ca(H_2PO_4)_2 \cdot H_2O + CaO \rightarrow 2CaHPO_4 + 2H_2O \quad (7)$$

$$Ca(H_2PO_4)_2 \cdot H_2O + Ca(OH)_2 \rightarrow 2CaHPO_4 + 3H_2O \quad (8)$$

$$Ca(H_2PO_4)_2 \cdot H_2O + CaCO_3 \rightarrow 2CaHPO_4 + 2H_2O + CO_2 \quad (9)$$

$$MgO + 2H_3PO_4 + 2H_2O \rightarrow Mg(H_2PO_4)_2 \cdot 2H_2O \quad (10)$$

$$Mg(OH)_2 + 2H_3PO_4 + H_2O \rightarrow Mg(H_2PO_4)_2 \cdot 2H_2O \quad (11)$$

$$MgCO_3 + 2H_3PO_4 + H_2O \rightarrow Mg(H_2PO_4)_2 \cdot 2H_2O + CO_2 \quad (12)$$

$$MgO + H_3PO_4 + 2H_2O \rightarrow MgHPO_4 \cdot 3H_2O \quad (13)$$

$$Mg(OH)_2 + H_3PO_4 + H_2O \rightarrow MgHPO_4 \cdot 3H_2O \quad (14)$$

$$MgCO_3 + H_3PO_4 + 2H_2O \rightarrow MgHPO_4 \cdot 3H_2O + CO_2 \quad (15)$$

$$Mg(H_2PO_4)_2 \cdot 2H_2O + MgO + 3H_2O \rightarrow 2MgHPO_4 \cdot 3H_2O \quad (16)$$

$$Mg(H_2PO_4)_2 \cdot 2H_2O + Mg(OH)_2 + 2H_2O \rightarrow 2MgHPO_4 \cdot 3H_2O \quad (17)$$

$$Mg(H_2PO_4)_2 \cdot 2H_2O + MgCO_3 + 3H_2O \rightarrow 2MgHPO_4 \cdot 3H_2O + CO_2 \quad (18)$$

After completion of such reaction species, the reaction between the calcium phosphate components occurring in the incinerated ash residue of chicken droppings and $H_3PO_4$ begins to proceed.

The reaction occurring in the initial stage between the alkaline earth metal compound and orthophosphoric acid is the reaction causing the formation of the primary phosphate (calcium or magnesium dihydrogen phosphate) $M(H_2PO_4)_2 \cdot nH_2O$ (water-soluble phosphate) (M representing an alkaline earth metal) (cf. the reaction formulas (1)-(3) and (10)-(12) given above). This is because the $H_3PO_4$ concentration in the reaction system becomes locally high, facilitating the formation of the primary phosphate(calcium or magnesium dihydrogen phosphate) having a high $P_2O_5$ content per molecule.

The primary phosphate(calcium or magnesium dihydrogen phosphate) formed occurs as fine crystals and is dissolved in excess water to increase the viscosity and, therefore, in the initial stage of the reaction process, it is viscous and forms crumbs.

As the reaction proceeds, the reaction causing the formation of the secondary phosphate(calcium or magnesium monohydrogen phosphate) $MHPO_4$ and/or $MHPO_4 \cdot nH_2O$ (citric acid-soluble phosphate) (cf. the reaction formulas (4)-(9) and (13)-(18) given above) becomes the main reaction, which occurs between the alkaline earth metal compound and $H_3PO_4$ or primary phosphates(calcium or magnesium dihydrogen phosphate) with excess water serving as a medium.

On that occasion, MO, $M(OH)_2$ and $MCO_3$ are highly reactive and the reaction mentioned above proceeds rapidly and the temperature of the whole system is raised by the heat of reaction, so that anhydrous secondary calcium phosphate (calcium monohydrogen phosphate) and secondary magnesium phosphate(magnesium monohydrogen phosphate) trihydrate, which are not formed at low temperatures (70° C. and lower), are formed.

The crude orthophosphoric acid solution is an unpurified concentrated orthophosphoric acid solution produced from a phosphate rock by the wet process and contains the $P_2O_5$ component mainly in the form of $H_3PO_4$. The currently existing crude orthophosphoric acid solutions have a concentration of about 44-48 parts by mass calculated as $P_2O_5$ and any of those falling within this concentration range can be used as the raw material in the practice of the invention without any problem. Those having a higher concentration exceeding that range can also be utilized.

If excess orthophosphoric acid remains after completion of such reactions, the $Ca_5(PO_4)_3(OH)$ [hydroxyapatite] and $Ca_3(PO_4)_2$ [tricalcium phosphate] occurring in the incinerated ash residue of chicken droppings react with $H_3PO_4$, and dicalcium phosphate species $CaHPO_4$ and $CaHPO_4 \cdot 2H_2O$ are formed. When, on the other hand, the amount of the alkaline earth metal compound in the reaction system is small, potassium dihydrogen phosphate $[KH_2PO_4]$ is formed.

On the contrary, in the case of reaction between the incinerated ash residue of chicken droppings and a orthophosphoric acid solution, the initial stage reaction, namely the reaction causing the formation of phosphate salts from alkaline earth metal compounds, itself occurs only to a lesser extent, so that the temperature rise in the system is slow and the later stage reactions hardly proceed. This means that the increase in solubility of the phosphate components is slight, the evaporation of water is also slight, and the product occurs as crumbs and tends to cake and, in addition, is highly viscous, hence cannot be crushed without preliminary drying. Further, when the amount of the phosphoric acid solution is reduced and the reaction is allowed to proceed using the phosphoric acid amount just required for neutralizing the alkaline earth metal compound, the effect of rendering the phosphate components effective or available cannot be expected.

When 5-200 parts by mass of an alkaline earth metal compound is admixed with 100 parts by mass of the incinerated ash residue of chicken droppings and a mineral acid is added to the resulting mixture, the free lime in the incinerated ash residue of chicken droppings and the alkaline earth metal compound react with the mineral acid and the system temperature rises to about 100° C. owing to the heat generated by this reaction, and secondary phosphates are formed.

Further, with the temperature rise, excess $H_3PO_4$ reacts with $Ca_5(PO_4)_3(OH)$ [hydroxyapatite] and $Ca_3(PO_4)_2$ [tricalcium phosphate], and calcium monohydrogen phosphate $CaHPO_4$ and $CaHPO_4 \cdot 2H_2O$ are formed.

Furthermore, the excess water is partly evaporated and partly taken up as crystal water and, as a result, a powder reduced in adhesiveness and cohesiveness and excellent in flowability can be readily obtained. Here, upon cooling the product to room temperature, crystals grow and the product takes up the bound water, so that the product can be obtained as a powder which is no more viscous; it is also possible to crush the aggregate readily without drying.

The reaction product powder obtained in the above manner can be subjected, in the conventional manner, to wet granulation, followed by drying, on a pan granulator, a drum granulator or the like, using lignin sulfonic acid, which is a byproduct in the pulp industry, molasses or a like binding agent and/or a phosphoric acid solution, to a grain size suited for use as a fertilizer, whereby a granular phosphorus/potassium-containing compound fertilizer containing citric acid-soluble phosphate($P_2O_5$) components and potash as KCl can be obtained.

As the raw material powder which contains an alkaline earth metal compound(s) as the main component(s) and is to be mixed with the powdery incinerated ash residue of chicken droppings in the practice of the invention, there may be mentioned quick lime, calcined shells, calcined magnesia, calcined dolomite, slaked lime, magnesium hydroxide, calcined dolomite hydrate (dolomite plaster), heavy calcium carbonate, light calcium carbonate, shell powders and dolomite powders, among others. One or two or more species selected from among these can be used.

The powder whose main component comprises an alkaline earth metal compound(s) shows better reactivity when its particle size is smaller. However, when its particle size is the same as that used in the general industrial fields, for example 600 μm or smaller, the powder can be used without any problem.

On the other hand, the mineral acid is preferably either one of phosphoric acid and sulfuric acid or a mixture thereof. When sulfuric acid alone is used, gypsum is formed as a product in addition to dicalcium phosphate. Under temperature conditions higher than 80° C., gypsum takes two forms, anhydrous gypsum and gypsum semihydrate and, at 80° C. or below, gypsum dihydrate is formed. When the gypsum content in the product becomes high, the fertilizer nutrient content decreases and, in addition, the product becomes sticky and difficult to crush.

In that case, the reaction mixture is allowed to stand at room temperature and, after maturation, dried and ground, and the resulting powder is granulated in the conventional manner for use. The ratio between the mixture composed of the incinerated ash residue of chicken droppings and the alkaline earth metal compound, each in powder form, and the mineral acid to be subjected to the reaction is such that when the alkaline earth metal compound fraction contained in the mixed powder is expressed as MO on the oxide basis, the mole ratio of the mineral acid to the MO is 1:1 and, when the mineral acid is $H_3PO_4$ and the ratio $MO/H_3PO_4=1.0$, the final product is $MHPO_4$ or $MHPO_4 \cdot nH_2O$, as illustrated by the reaction formulas (1)-(18).

When the mineral acid is $H_2SO_4$, the final product is $CaSO_4$, $CaSO_4 \cdot \frac{1}{2}H_2O$, $CaSO_4 \cdot 2H_2O$ or $MgSO_4$.

Since, however, the MO fraction contained in chicken droppings is rich in those MO species derived from quick lime, slaked lime, calcium carbonate and magnesium oxide and, further, from hydroxyapatite and tricalcium phosphate, and the lime fraction in these calcium phosphate type compounds is low in reactivity with acids, the mole ratio $MO/H_3PO_4=1.0$ results in an acid excess condition.

The reactivity becomes higher as the system inside temperature rises and, as the temperature lowers, it becomes poorer. Therefore, an adequate MO/mineral acid mole ratio should be selected according to the content of reactive alkaline components; since hydroxyapatite, in particular, is low in reactivity, it is necessary to adjust that mole ratio to about 1.0-2.0 according to the condition of the reaction mixture.

When the MO/mineral acid mole ratio is below 1.0, the phosphate component forms $M(H_2PO_4)_2 \cdot nH_2O$ and the reaction mixture becomes viscous and crumb-like or slurry-like.

As the amount of the mineral acid decreases, the pH of the reaction mixture exceeds 7.0, with the result that not only an unreacted portion of the MO but also tricalcium phosphate and hydroxyapatite remain in the reaction mixture and the decomposition of the hardly soluble phosphates in the incinerated ash residue of chicken droppings can hardly proceed any longer.

On the other hand, when the MO/mineral acid mole ratio is excessively high, the pH of the reaction mixture shows alkalinity and, further, fails to contribute toward rendering the phosphate components effective or available.

The reactions of hydroxyapatite and tricalcium phosphate with orthophosphoric acid or sulfuric acid are as follows:

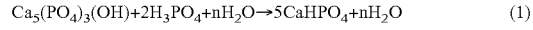

$$Ca_5(PO_4)_3(OH)+2H_3PO_4+nH_2O \rightarrow 5CaHPO_4+nH_2O \quad (1)$$

$$Ca_3(PO_4)_2+H_3PO_4+nH_2O \rightarrow 3CaHPO_4+nH_2O \quad (2)$$

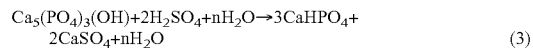

$$Ca_5(PO_4)_3(OH)+2H_2SO_4+nH_2O \rightarrow 3CaHPO_4+2CaSO_4+nH_2O \quad (3)$$

$$Ca_3(PO_4)_2+H_2SO_4+nH_2O \rightarrow 2CaHPO_4+CaSO_4+nH_2O \quad (4)$$

As for the apparatus for reacting the mixture composed of the incinerated ash residue of chicken droppings and the alkaline earth metal compound, each in powder form, with the crude phosphoric acid, any kind of apparatus can be utilized provided that it is capable of uniformly mixing up and stirring the both.

For efficiently carrying out the solid-liquid reaction between the powder and mineral acid, a batch type mixer capable of exerting a strong shear strength, for example a Henschel mixer, or a Funken Powtechs' (Funken Powtechs' Inc. Japan) flow jet mixer for continuous reaction, is used, and the powder reactant is fed thereto precisely at a predetermined rate of feeding using a continuous metering feeder, while the mineral acid is fed to the flow jet mixer, for instance, in the same manner, namely continuously at a predetermined rate of feeding, for uniform mutual dispersion of the powder and acid in a short time to enable the reaction to proceed efficiently; such mode of reaction is desirable.

The powdery phosphatic fertilizer composition obtained can be utilized as a phosphorus/potassium-containing compound fertilizer containing, as main components, Calcium monohydrogen phosphate, which is a citric acid-soluble $P_2O_5$ component, and potassium chloride, which is a water-soluble $K_2O$ component.

Further, this composition hardly shows a tendency toward adhesion or caking on the occasion of powder transfer and metering and, therefore, contributes to an improvement of productivity in manufacturing the same and, furthermore, it can be utilized as a raw material suited for the manufacture of granular phosphorus/potassium-containing compound fertilizer.

The powdery phosphorus/potassium-containing compound fertilizer composition mentioned above can be made into granules having an appropriate hardness by adding an adequate amount of an $H_3PO_4$-containing aqueous solution thereto, followed by granulation. This is possible because $MHPO_4$ contained in the powdery phosphorus/potassium-containing compound fertilizer composition reacts with $H_3PO_4$ to form a viscous primary phosphate and this viscous matter firmly binds powder particles together to give high-density granules.

When 5.0-15.0 parts by mass, as expressed on the $P_2O_5$ basis, of an aqueous $H_3PO_4$ solution is added to 100 parts by mass of the powdery phosphatic fertilizer composition, the mixture acquires a viscosity suitable for granulation and gives granules having an appropriate hardness.

When the amount of the orthophosphoric acid solution is smaller than 5.0 parts by mass, the yield of the primary phosphate(calcium or magnesium dihydrogen phosphate) is insufficient and the force binding particles together is therefore weak, so that the granulatability becomes poor and the granulation product only has such a hardness that the grains can be readily crushed with fingertips. When the amount is greater than 15.0 parts by mass, the primary phosphate is yielded in excess, so that the viscosity becomes excessively high, hence the granulatability becomes poor.

The aqueous $H_3PO_4$ solution to be added for granulation preferably contains $H_3PO_4$ in an amount of not smaller than 10 parts by mass as expressed on the $P_2O_5$ basis. Whether the granulation results are good or bad depends on the concentration of $P_2O_5$, and a higher concentration thereof produces a higher thickening effect per unit addition level, hence resulting in a reduction in the amount of the aqueous $H_3PO_4$ solution. Concentrations below 10 parts by mass are not preferred since the effect of addition will be weak unless the aqueous $H_3PO_4$ solution is added in a greater amount.

The granulation of the powdery phosphorus/potassium-containing compound fertilizer composition can be accomplished with ease using any of the existing apparatus generally used in the manufacture of granular fertilizers, for example oscillating granulators such as pan granulators and rotary drum granulators.

It is also possible to wet granulate the powdery phosphorus/potassium-containing fertilizer composition by adding molasses and/or a lignin-based binder. However, a fairly large amount of such binder is required and, when the solid matter concentration thereof is 5%, for instance, the granulation product 2-3 mm in size after drying has a strength of only about 1 kg and, in addition, the fertilizer component content is lowered and, therefore, the use of such additive is uneconomical and unfavorable.

The heating/drying treatment of the granulation product can be carried out using an apparatus in which the heating/drying temperature can be set at about 100-300° C., preferably such a drier for granular fertilizer manufacturing as a rotary drier allowing ready adjustment of the heating/drying time.

The granular phosphorus/potassium-containing compound fertilizer composition obtained contains citric acid-soluble $P_2O_5$ abundantly and further contains water-soluble $K_2O$ and, therefore, can be expected to show high fertilizer effects. Further, it will hardly scatter on the occasion of fertilizer application and, after application, it will be hardly washed away by rainwater; thus, the fertilizer nutrients can be used efficiently. Furthermore, that composition has an appropriate hardness and, therefore, can be used in admixture with another granular fertilizer.

EXAMPLES

The following Examples and Comparative Examples further illustrate the present invention. These examples are, however, by no means limitative of the scope of the invention.

One of the alkaline earth metal compound powders shown in Table 3 (alkaline earth metal compound species, chemical composition, grain size) was mixed with the incinerated ash residue of chicken droppings as specified in Table 1 (results of analysis of the incinerated ash residue of chicken droppings for fertilizer nutrient components) and Table 2 [the chemical components of the incinerated ash residue of chicken droppings (results of fluorescent X-ray analysis)] using a mixer, and a mineral acid was added to the resulting mixture and the reaction was allowed to proceed to confirm the effect of rendering the phosphate component effective or available.

In Table 4, there are shown the alkaline earth metal compound species added and the amount thereof per 100 parts by mass of the incinerated ash residue of chicken droppings, the mineral acid species added, the level of addition thereof and the concentrations of $H_3PO_4$ and $H_2SO_4$ in the mineral acid, and the mole ratio [$MO/(H_3PO_4+H_2SO_4)$] of the alkaline earth metal compound components, namely calcium and magnesium compounds (M=Ca, Mg), as calculated as the oxides thereof MO, to the total mineral acid.

TABLE 1

Results of analysis, for fertilizer nutrients, of incinerated ash residue of chicken droppings

| $T-P_2O_5$ | $C-P_2O_5$ | $W-P_2O_5$ | $C-P_2O_5/T-P_2O_5$ | pH |
|---|---|---|---|---|
| 20.3% | 15.5% | 0.0% | 76.3 | 12.5 |

TABLE 2

Chemical components in incinerated ash residue of chicken droppings (results of fluorescent X-ray analysis)

| | |
|---|---|
| CaO | 32.0% |
| $P_2O_5$ | 20.1% |
| $K_2O$ | 15.5% |
| $SO_3$ | 10.0% |
| MgO | 5.5% |
| Cl | 5.5% |
| $SiO_2$ | 3.0% |

TABLE 2-continued

Chemical components in incinerated ash residue of
chicken droppings (results of fluorescent X-ray analysis)

| | |
|---|---|
| $Na_2O$ | 3.0% |
| $Al_2O_3$ | 0.59% |
| $Fe_2O_3$ | 0.56% |
| MnO | 0.21% |
| ZnO | 0.19% |
| Ig. Loss | 3.7% |
| Total | 99.9% |

TABLE 3

Alkaline earth metal compound species,
chemical components and grain size

| Alkaline earth metal compound | CaO (%) | MgO (%) | Grain size |
|---|---|---|---|
| Slaked lime | 71.9 | 1.7 | Entirely passing through 600 μm of standard sieve |
| Calcined magnesia | 5.0 | 92.0 | Entirely passing through 600 μm of standard sieve |
| Calcined dolomite hydrate | 61.4 | 32.9 | Entirely passing through 600 μm of standard sieve |
| Dolomite powder | 35.2 | 17.3 | Entirely passing through 600 μm of standard sieve |

$MO/(H_3PO_4+H_2SO_4)=1.85$) were subjected to reaction by continuously feeding them to a flow jet mixer (product of Funken Powtechs' Inc. Japan) and mixing up them with stirring.

The actual rates of feeding were 10.0 kg/minute of the mixed powder composed of the incinerated ash residue of chicken droppings and slaked lime and 5.8 kg/minute of the crude orthophosphoric acid, and they were continuously fed to the flow jet mixer by means of weight feeders.

During reaction, the temperature rose owing to the heat of reaction and water vapor was generated vigorously. As a result, a dry powder (referred to as "reaction product") showing high flowability was obtained without needing drying. Aggregates were observed in part but could be easily crushed by the hand.

The reaction product was allowed to be cured and then analyzed for fertilizer nutrients, giving the following results: T-$P_2O_5$ 34.2%, C—$P_2O_5$ 31.5%, W—$P_2O_5$ 8.9%, T-$K_2O$ 11.8%, C—$K_2O$ 11.7%, W—$K_2O$ 10.9%, T-MgO 4.2%, C—MgO 3.0%, C—MgO 3.0%, and pH 6.2.

In the above data, T indicates the total content found by the method of fertilizer analysis, C indicates the citric acid-soluble fraction content found by the method of fertilizer analysis, and W indicates the water-soluble fraction content found by the method of fertilizer analysis.

Paying attention to the phosphate components in the reaction product, the extent to which the tricalcium phosphate and

TABLE 4

Incinerated ash residue of chicken droppings, alkaline earth metal compound species,
mineral acid species, and amounts thereof added

| | | | Mineral acid | | | |
|---|---|---|---|---|---|---|
| | Alkaline earth metal compound | | Orthophosphoric acid and sulfuric acid concentrations | | Addition level | |
| Incinerated ash residue of chicken droppings (parts by mass) | Species | Amount admixed (parts by mass) | $H_3PO_4$ (%) | $H_2SO_4$ (%) | Mineral acid (parts by mass) | [MO/($H_3PO_4$ + $H_2SO_4$)] mole ratio |
| Example 1 | 100 | Slaked lime | 5 | 66.2 | 4.5 | 60.9 | 1.85 |
| Example 2 | 100 | Slaked lime | 25 | 66.2 | 4.5 | 97.5 | 1.53 |
| Example 3 | 100 | Slaked lime | 200 | 66.2 | 4.5 | 420.0 | 1.12 |
| Example 4 | 100 | Calcined magnesia | 25 | 66.2 | 4.5 | 135.0 | 1.39 |
| Example 5 | 100 | Calcined dolomite hydrate | 25 | 66.2 | 4.5 | 120.0 | 1.43 |
| Example 6 | 100 | Dolomite powder | 25 | 66.2 | 4.5 | 90.0 | 1.59 |
| Example 7 | 100 | Slaked lime | 25 | 53.0 | 22.8 | 92.5 | 1.53 |
| Example 8 | 100 | Slaked lime | 25 | — | 96.0 | 72.5 | 1.53 |
| Comparative Example 1 | 100 | — | — | 66.2 | 4.5 | 52.0 | 2.00 |
| Comparative Example 2 | 100 | Slaked lime | 1 | 66.2 | 4.5 | 54.5 | 1.97 |
| Comparative Example 3 | 100 | Slaked lime | 300 | 66.2 | 4.5 | 600.0 | 1.09 |

Example 1

As shown in Table 4, 100 parts of the incinerated ash residue of chicken droppings and 5 parts by mass of a slaked lime powder were weighed and blended together in a mixer. The mixed powder and 60.4 parts by mass of a crude orthophosphoric acid containing 66.2% of $H_3PO_4$ and 4.5% of $H_2SO_4$ (the mixing ratio of both reactants corresponding to hydroxyapatite contained in the incinerated ash residue of chicken droppings were rendered effective or available by the mineral acid according to the reaction formulas (1)-(4) given above is shown in Table 6 (Phosphatic fertilizer component ($P_2O_5$) contents in reaction product) in terms of citric acid solubilization ratio (B/A).

In the above, A denotes the T-$P_2O_5$ content derived from the incinerated ash residue of chicken droppings, and B denotes the C—$P_2O_5$ content derived from the incinerated ash residue of chicken droppings.

The citric acid solubilization percentage of the $P_2O_5$ component derived from the incinerated ash residue of chicken droppings as shown in Table 6 was calculated in the following manner.

The calculations for Example 1 are taken by way of example. Calculations based on the amounts, shown in Table 4, of the raw materials used give the following: the T-$P_2O_5$ derived from the incinerated ash residue of chicken droppings: (20.3 parts by mass)=100 parts by mass×content (20.3%); the T-$P_2O_5$ derived from the mineral acid: (29.2 parts by mass) =60.9 parts by mass×66.2% (orthophosphoric acid concentration)×72.42% ($P_2O_5$ content); the ratio of the T-$P_2O_5$ in the incinerated ash residue of chicken dropping to the mineral acid-derived T-$P_2O_5$ contained in the raw material mixture being 20.3:29.2.

The T-$P_2O_5$ in the reaction product is 34.2%, as indicated by the analytical value. Since this is the same percentage as that in the raw material mixture, the T-$P_2O_5$, in the reaction product, derived from the incinerated ash residue of chicken droppings is 34.2×[(20.3)/(20.3)+(29.2)]=14.02 (cf. A in Table 6).

As for the C—$P_2O_5$, on the other hand, (T-$P_2O_5$ indicated by the analytical value for the reaction product)=(T-$P_2O_5$ derived from the incinerated ash residue of chicken droppings)+(mineral acid-derived T-$P_2O_5$) and the mineral acid-derived T-$P_2O_5$=mineral acid-derived C—$P_2O_5$; thus, the C—$P_2O_5$ derived from the incinerated ash residue of chicken droppings was calculated as follows: (C—$P_2O_5$ indicated by the analytical value for the reaction product)−(mineral acid-derived T-$P_2O_5$).

The mineral acid-derived T-$P_2O_5$ is 34.2×[(29.2)/(20.3)+(29.2)]=20.2; hence, the C—$P_2O_5$ derived from the incinerated ash residue of chicken dropping is (31.5)−(20.2)=11.3 (cf. B in Table 6).

Calculations were carried out in the same manner for Examples 2-8 and Comparative Examples 1-3.

Table 6 indicates that as compared with the citric acid solubilization percentage (76.6%) in Comparative Example 1 where the incinerated ash residue of chicken droppings alone was reacted with the crude orthophosphoric acid, that percentage in Example 1 is 80.8%; thus, the phosphate component was rendered effective or available.

In each of Examples 2-8 and Comparative Examples 1-3, the reaction was carried out in the same manner using a flow jet mixer, and the reaction product was analyzed for T-$P_2O_5$, C—$P_2O_5$ and W—$P_2O_5$ in the same manner. The results thus obtained are summarized in Table 6. The raw material feeding rates in the continuous reaction in the flow jet mixer are as given in Table 5 (Material feeding rates in flow jet mixer continuous reaction).

TABLE 5

Material feeding rates in flow jet mixer continuous reaction

|  | Raw material mixture (kg/min) | Mineral acid (kg/min) |
|---|---|---|
| Example 2 | 10.0 | 7.8 |
| Example 3 | 5.0 | 7.0 |
| Example 4 | 5.0 | 5.4 |
| Example 5 | 5.0 | 4.8 |
| Example 6 | 5.0 | 7.2 |
| Example 7 | 5.0 | 7.4 |
| Example 8 | 5.0 | 5.8 |
| Comparative example 1 | 10.0 | 5.2 |
| Comparative example 2 | 10.0 | 5.4 |
| Comparative example 3 | 5.0 | 7.5 |

TABLE 6

$P_2O_5$ contents in reaction products

|  | T-$P_2O_5$ (%) | | C-$P_2O_5$ (%) | | Citric acid solubilization | |
|---|---|---|---|---|---|---|
|  | Reaction product T-$P_2O_5$ | Incinerated chicken droppings ash residue-derived T-$P_2O_5$ (A) | Reaction product C-$P_2O_5$ | Incinerated chicken droppings ash residue-derived C-$P_2O_5$ (B) | percentage of $P_2O_5$ derived from incinerated chicken droppings ash residue in reaction product, B/A (%) | W-$P_2O_5$ (%) Reaction product |
| Example 1 | 34.2 | 14.0 | 31.5 | 11.3 | 80.8 | 8.9 |
| Example 2 | 39.8 | 12.1 | 38.2 | 10.5 | 86.7 | 8.6 |
| Example 3 | 41.7 | 3.8 | 41.4 | 3.2 | 84.3 | 6.6 |
| Example 4 | 38.4 | 9.2 | 37.1 | 7.9 | 85.8 | 7.1 |
| Example 5 | 36.0 | 9.4 | 35.0 | 8.4 | 89.3 | 7.7 |
| Example 6 | 29.2 | 9.3 | 28.2 | 8.3 | 89.3 | 6.8 |
| Example 7 | 31.9 | 11.6 | 31.5 | 11.2 | 96.6 | 9.6 |
| Example 8 | 12.4 | 12.4 | 11.8 | 11.8 | 95.2 | 1.4 |
| Comparative example 1 | 31.6 | 14.2 | 28.3 | 10.9 | 76.7 | 10.4 |
| Comparative example 2 | 32.2 | 14.1 | 29.0 | 10.9 | 77.3 | 9.4 |
| Comparative example 3 | 41.5 | 2.7 | 41.0 | 2.2 | 81.7 | 5.1 |

In Examples 1-8, the citric acid solubilization percentages of the incinerated chicken droppings ash residue-derived $P_2O_5$ in the reaction products were higher as compared with Comparative Example 1. On the other hand, the contents other than $P_2O_5$ were as shown in Table 7 (Fertilizer nutrients other than $P_2O_5$ in reaction products and pH values). The $K_2O$ component is derived from the unreacted potassium chloride contained in the incinerated ash residue of chicken droppings and, in Examples 1 and 2, from the unreacted potassium chloride and the potassium dihydrogen phosphate newly formed.

TABLE 7

Other than $P_2O_5$ in reaction products and pH values

|  | T-$K_2O$ (%) | C-$K_2O$ (%) | W-$K_2O$ (%) | T-MgO (%) | C-MgO (%) | pH |
|---|---|---|---|---|---|---|
| Example 1 | 11.8 | 11.7 | 10.2 | 4.2 | 3.0 | 6.2 |
| Example 2 | 10.0 | 9.7 | 8.3 | 3.2 | 2.5 | 5.9 |
| Example 3 | 4.2 | 4.2 | 3.7 | 2.0 | 1.5 | 5.8 |
| Example 4 | 8.9 | 8.6 | 8.1 | 13.1 | 11.9 | 6.1 |
| Example 5 | 8.8 | 8.2 | 7.6 | 8.8 | 8.1 | 6.0 |
| Example 6 | 10.2 | 10.0 | 8.9 | 6.2 | 4.1 | 6.8 |
| Example 7 | 10.3 | 9.7 | 9.1 | 4.7 | 3.7 | 5.8 |
| Example 8 | 10.8 | 10.6 | 9.9 | 4.2 | 3.5 | 5.9 |
| Comparative example 1 | 12.6 | 12.4 | 11.1 | 5.2 | 3.8 | 6.5 |
| Comparative example 2 | 12.5 | 12.4 | 11.0 | 5.1 | 3.4 | 6.5 |
| Comparative example 3 | 2.4 | 2.1 | 1.8 | 1.1 | 0.5 | 6.0 |

The results of powder X-ray analysis of each reaction product for the chemical composition thereof and the handleability evaluation results are shown in Table 8.

TABLE 8

Results of powder X-ray analysis of reaction products and conditions thereof

|  | Chemical phases identified by powder X-ray analysis | Condition of reaction product |
|---|---|---|
| Example 1 | Calcium monohydrogen phosphate anhydrous<br>Potassium dihydrogen phosphate<br>Calcium sulfate anhydrous<br>Potassium chloride<br>Hydroxyapatite | Dry and free flowing with some soft lumps which is easily broken by fingers. |
| Example 2 | Calcium monohydrogen phosphate anhydrous<br>Potassium dihydrogen phosphate<br>Calcium sulfate anhydrous<br>Potassium chloride<br>Hydroxyapatite | Dry and free flowing with some soft lumps which is easily broken by fingers. |
| Example 3 | Calcium monohydrogen phosphate anhydrous<br>Calcium sulfate anhydrous<br>Potassium chloride<br>Hydroxyapatite | Dry and free flowing with some soft lumps which is easily broken by fingers. |
| Example 4 | Calcium monohydrogen phosphate anhydrous<br>Magnesium monohydrogen phosphate trihydrate<br>Potassium chloride<br>Hydroxyapatite | Dry and free flowing with some soft lumps which is easily broken by fingers. |
| Example 5 | Calcium monohydrogen phosphate anhydrous<br>Magnesium monohydrogen phosphate trihydrate<br>Potassium chloride<br>Hydroxyapatite | Dry and free flowing with some soft lumps which is easily broken by fingers. |
| Example 6 | Calcium monohydrogen phosphate anhydrous<br>Magnesium monohydrogen phosphate trihydrate<br>Calcium sulfate, anhydrous<br>Potassium chloride<br>Hydroxyapatite | Dry and free flowing with some soft lumps which is easily broken by fingers. |
| Example 7 | Calcium monohydrogen phosphate anhydrous<br>Potassium chloride<br>Hydroxyapatite<br>Calcium sulfate anhydrous | Dry and free flowing with some soft lumps which is easily broken by fingers. |
| Example 8 | Calcium monohydrogen phosphate anhydrous<br>Potassium chloride<br>Hydroxyapatite<br>Calcium sulfate anhydrous | Some soft lumps which is easily broken by fingers. |
| Comparative example 1 | Calcium monohydrogen phosphate anhydrous<br>Potassium dihydrogen phosphate<br>Tricalcium phosphate<br>Potassium chloride<br>Hydroxyapatite | Became lumps with increased viscosity. Failed to become powder form. |
| Comparative example 2 | Calcium monohydrogen phosphate, anhydrous<br>Potassium dihydrogen phosphate<br>Tricalcium phosphate<br>Potassium chloride<br>Hydroxyapatite | Became lumps with increased viscosity. Failed to become powder form. |

TABLE 8-continued

Results of powder X-ray analysis of reaction products and conditions thereof

| | Chemical phases identified by powder X-ray analysis | Condition of reaction product |
|---|---|---|
| Comparative example 3 | Calcium monohydrogen phosphate, anhydrous<br>Calcium sulfate, anhydrous<br>Potassium chloride<br>Hydroxyapatite | Dry and free flowing with some soft lumps which is easily broken by fingers. |

As is evident from the data shown in Tables 6-8, the phosphorus/potassium-containing compound fertilizer compositions according to the invention were dry and free flowing with some soft lumps which is easily broken by fingers. They were in good handleability. The solubility % in citric acid for $P_2O_5$ derived from calcined ash of chicken droppings, exceeds 80%, which is sufficient for realizing the object of the present invention, namely rendering the phosphate fraction effective or available.

On the contrary, in Comparative Examples 1 and 2, in which no alkaline earth metal compound was incorporated or the alkaline earth metal compound addition level was below 5 parts by mass, the quantity of heat generated upon reaction was small and, therefore, the steam generation was insufficient and the reaction products became highly viscous and formed lumps. The decomposition (rendering available) of the hardly soluble phosphates did not proceed to a sufficient extent.

When the level of addition of an alkaline earth metal compound exceeds 300 parts by mass, as in Comparative Example 3, there are no problems as far as the heat generation upon reaction and the percent of solubilization of the incinerated chicken droppings ash residue-derived $P_2O_5$ in citric acid (81.7%, Table 6) are concerned; however, the amount of the incinerated ash residue of chicken droppings that can be utilized becomes smaller and this is unfavorable.

Thus, it is presumable that, in rendering the $P_2O_5$ in the incinerated ash residue of chicken droppings effective or available according to the present invention, the reaction of tricalcium phosphate in the incinerated ash residue of chicken droppings with a mineral acid to give Calcium monohydrogen phosphate according to the reaction formula (2) or (4) given hereinabove is predominant and decomposition reaction of hydroxyapatite is scarcely involved.

Example 9

An Example of Granulation of the Reaction Product Obtained in Example 2

A 5.0-kg portion of the reaction product obtained in Example 2 was weighed, 1.7 kg of an aqueous $H_3PO_4$ solution having a $P_2O_5$ concentration of 30.0% by mass (corresponding to 0.5 kg of $P_2O_5$ and to 10.0 parts by mass of $P_2O_5$ relative to the reaction mixture) was added thereto and mixed therewith for dispersion using a mixer.

The mixture was granulated to a grain size of about 1.0-5.0 mm with rotation and oscillation using a pan granulator while spraying the mixture with pure water. The granulation product was transferred to an electrically heated drier and dried under heating at 100° C. for 3 hours to give granules. Ten (10) grains with a size of 2.38-2.83 mm were sampled and measured for crushing strength. The average crushing strength was 2.1 kg. This was such a hardness that the grains could not be crushed by fingertips.

This granulation product was analyzed for T-$P_2O_5$, C—$P_2O_5$, W—$P_2O_5$, T-$K_2O$, C—$K_2O$, W—$K_2O$, T-MgO, C—MgO and pH by the methods of fertilizer analysis. The results are shown in Table 9.

Example 10

An example of Granulation of the Reaction Product Obtained in Example 3

A 5.0-kg portion of the reaction product obtained in Example 3 was weighed, 313 g of molasses with a solid matter concentration of 80% (corresponding to 250 g of a solid matter, 5 parts by mass relative to the reaction product) was added thereto and mixed therewith for dispersion using a mixer.

The mixture was granulated to a grain size of about 1.0-5.0 mm with rotation and oscillation using a pan granulator while spraying the mixture with pure water. The granulation product was transferred to an electrically heated drier and dried under heating at 100° C. for 3 hours to give granules. Ten (10) grains with a size of 2.38-2.83 mm were sampled and measured for crushing strength. The average crushing strength was 1.3 kg.

This granulation product was analyzed for T-$P_2O_5$, C—$P_2O_5$, W—$P_2O_5$, T-$K_2O$, C—$K_2O$, W—$K_2O$, T-MgO, C—MgO and pH by the methods of fertilizer analysis. The results are shown in Table 9.

As described hereinabove, the fertilizer of the invention is a novel phosphorus/potassium-containing compound fertilizer containing available forms of $P_2O_5$ and $K_2O$. In cases where an increased percentage of the $K_2O$ component is desired, an appropriate amount such a component as potassium chloride may be added on the occasion of preparing the mixed powder or granulating the reaction product.

TABLE 9

| | | T-$P_2O_5$ (%) | C-$P_2O_5$ (%) | W-$P_2O_5$ (%) | T-$K_2O$ (%) | C-$K_2O$ (%) | W-$K_2O$ (%) | T-MgO (%) | C-MgO (%) | pH |
|---|---|---|---|---|---|---|---|---|---|---|
| Example 9 | Example of granulation of the product of Example 2 | 40.1 | 38.9 | 9.5 | 9.2 | 8.9 | 8.0 | 3.0 | 2.7 | 5.0 |
| Example 10 | Example of granulation of the product of Example 3 | 41.2 | 41.1 | 6.4 | 4.0 | 3.9 | 3.5 | 1.9 | 1.7 | 5.8 |

INDUSTRIAL APPLICABILITY

The method of producing novel phosphorus/potassium containing compound fertilizers according to the invention is characterized in that 5-200 parts by mass of an alkaline earth metal compound is admixed with 100 parts by mass of an incinerated ash residue of chicken droppings, adding a mineral acid to the resulting mixture and allowing the reaction to proceed, wherein the heat of neutralization between the alkaline earth metal compound and the mineral acid can be utilized for raising the reaction system temperature to thereby promote the reaction between the incinerated ash residue of chicken droppings and the mineral acid and thus carry out the reaction efficiently. The hardly soluble $Ca_5(PO_4)_3(OH)$ [hydroxyapatite] and $Ca_3(PO_4)_2$ [tricalcium phosphate] contained therein can be converted to citric acid-soluble components and thus rendered effective or available and, at the same time, the product can be maintained neutral or weakly acidic and, therefore, can be blended with other acid fertilizers or ammoniacal nitrogen fertilizers. In addition, the product can be obtained in powder form showing improved handleability. The invention produces such remarkable effects. The novel phosphorus/potassium-containing compound fertilizers obtained by the production method of the invention can be effectively and efficiently utilized owing to the conversion of the hardly soluble $Ca_5(PO_4)_3(OH)$ [hydroxyapatite] and $Ca_2(PO_4)_2$ [tricalcium phosphate] contained in the incinerated ash residue of chicken droppings to citric acid-soluble components and, at the same time, they are neutral or weakly acidic, so that they can be utilized either singly or in admixture with other acid fertilizers or ammoniacal nitrogen fertilizers. In addition, the products are easy-to-handle because they are in powder form. The invention which produces such marked effects is very high in industrial applicability.

The invention claimed is:

1. A method of producing phosphorus/potassium-containing compound fertilizers which comprises admixing 5-200 parts by mass of an alkaline earth metal compound with 100 parts by mass of an incinerated ash residue of chicken droppings, adding a mineral acid thereto, and allowing the reaction to proceed so as to convert $P_2O_5$ contained in the incinerated ash residue of chicken droppings into a citric acid soluble form.

2. A method of production as claimed in claim 1, wherein the alkaline earth metal compound comprises one or two or more species selected from the grouping consisting of calcium hydroxide, calcium oxide, calcium carbonate, calcined shells, magnesium hydroxide, magnesium oxide, magnesium carbonate, dolomite and shell powders.

3. A method of production as claimed in claim 1, wherein the mineral acid is either of orthophosphoric acid or sulfuric acid or a mixture thereof.

4. A method of production as claimed in claim 2, wherein the mineral acid is either of orthophosphoric acid or sulfuric acid or a mixture thereof.

5. The method of producing phosphorous/potassium-containing compound fertilizers according to claim 1, wherein the extent of conversion of $P_2O_5$ into a citric acid soluble form exceeds 80%.

* * * * *

UNITED STATES PATENT AND TRADEMARK OFFICE
CERTIFICATE OF CORRECTION

| | |
|---|---|
| PATENT NO. | : 7,452,398 B2 |
| APPLICATION NO. | : 11/518867 |
| DATED | : November 18, 2008 |
| INVENTOR(S) | : Teruo Urano et al. |

Page 1 of 1

It is certified that error appears in the above-identified patent and that said Letters Patent is hereby corrected as shown below:

On the Title Page
Item (75) Inventors, "Teruo Urano, Sano (JP); Yuya Sato, Sano (JP)" should read as follows:

--Teruo Urano, Sano-shi, Tochigi (JP); Yuya Sato, Sano-shi, Tochigi (JP)--.

Signed and Sealed this

Twelfth Day of January, 2010

David J. Kappos
*Director of the United States Patent and Trademark Office*